Nov. 9, 1943.  F. TRYFUS  2,333,833
METHOD AND MEANS FOR PRODUCING DENTAL WORK
Filed May 23, 1941
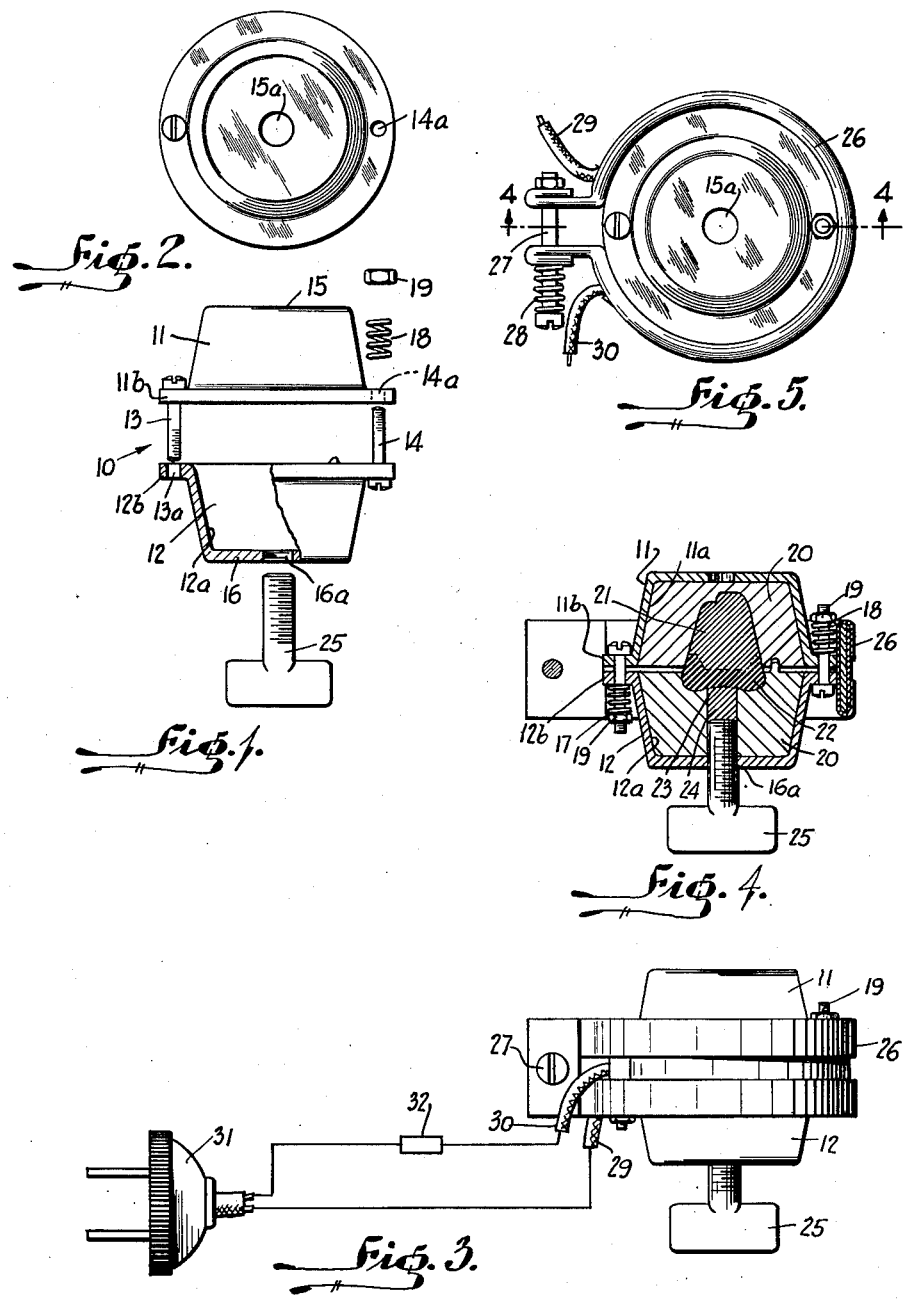
INVENTOR.
FREDERIC TRYFUS.
BY Leon M. Strauss Patented Nov. 9, 1943

2,333,833

UNITED STATES PATENT OFFICE 2,333,833

METHOD AND MEANS FOR PRODUCING DENTAL WORK

Frederic Tryfus, Forest Hills, N. Y.

Application May 23, 1941, Serial No. 394,755

6 Claims. (Cl. 18—33)

This invention relates to a method and means, such as flask-like containers or molds for producing inlays, jacket crowns, bridge-work and like dental work.

It is an object of the present invention to provide a method of manufacturing jacket crowns or the like from a formable material, such as resinous material in a mold upon which material pressure may be exerted from without said mold; said pressure may be applied to said material for the purpose of densifying and compressing the same.

Another object of the present invention is to provide a method of the above character in which as a further step or stage pressure upon the crown or similar tooth body forming material is added and exerted upon excess material provided in said mold.

A still further object of the present invention is to provide a mold or flask for carrying into effect the aforesaid method, said mold preferably consisting of two pieces or parts, upper and lower, respectively, which possess tapered inner walls to facilitate removal of the casting therefrom.

It is still a further object of the present invention to provide complementary mold parts, at least one of which being provided with means to facilitate access from without said mold to the casting and/or body material to be formed within said mold.

Still another object of the present invention is to provide openings either of similar or different dimensions preferably in the bottom parts of the upper and lower mold parts to facilitate adding of casting material and/or exertion of pressure on the body material within the mold.

Still a further object of the present invention is to provide preferably yieldable clamping means for connecting the mold parts and for compensating the outer pressure which may be exerted on said mold parts.

It is another object of the present invention to provide removable heating means which may be joined to the mold at a location thereof to bring about a gradual and slow heat influence to the body to be formed in said mold casting whereby a hardened and firm article, such as a tooth body can be produced.

Yet, another object of the present invention resides in the provision of adjustable means for said heating means which may be displaceably arranged preferably on projecting part or parts of said mold.

It is still another object of the present invention to provide a method of producing dental parts or articles in a mold comprised of a plurality of mold parts and having the above characteristics.

These and other objects and advantages of the invention will appear from the following disclosure thereof together with the attached drawing which illustrates a certain form of embodiment thereof. This form is shown for the purpose of illustrating the invention since the same has been found in practice to give satisfactory and reliable results, although it is to be understood that the various parts of which the invention consists, can be variously arranged and organized and that the invention is not limited to the precise arrangement and organization of the instrumentalities as herein shown and dedescribed.

In the drawing:

Fig. 1 is an exploded view of a two-part mold (partly in section) made in accordance with the invention.

Fig. 2 is a top plan view of one of the mold parts.

Fig. 3 is a side elevational view of a mold embodying the invention and provided with heating means and electric cable therefor.

Fig. 4 is a cross-sectional view taken along line 4—4 of Fig. 5.

Fig. 5 is a top plan view of the mold illustrated in Fig. 3.

Referring now particularly to the drawing, there is disclosed in Fig. 1 a mold 10 made in accordance with the invention which mold comprises the upper mold part 11 and lower mold part 12. Mold parts 11, 12 are each provided with tapered inner walls 11a, 12a, respectively, flanges 11b and 12b extending therefrom and preferably screw threaded pins 13, 14 for respective engagement with openings 13a, 14a provided in said flanges 12b and 11b. Bottom portions 15, 16 of mold parts 11, 12 have one or more perforations, such as 15a, 16a for a purpose hereinafter described. Mold parts 11 and 12 are disposed with their flanges 11b and 12b in contact and with their conical or tapered walls 11a and 12a in opposed relation. In order to permit adjustment of said mold parts 11, 12 and relative fitting thereof, the pins 13, 14 are inserted within the respective openings 13a, 14a and helical springs 17, 18 disposed over the free ends of said pins coact with nuts 19 to maintain said mold parts under pressure, as clearly seen in Fig. 4. These spring clamp means 13—14—17—

18—19 exert outer pressure upon the joined mold parts 11, 12.

In order to carry out the process of the invention suitable investment or casting material, such as plaster of Paris, 20 is placed first within the mold part 11 and the tooth pattern or die 21 of wax or wax-like material is embedded within said casting material of mold part 11, whereas crown part 22 of said die projects therefrom. After the casting of mold part 11 has set, mold part 12 is filled with plaster of Paris and the two mold parts 11, 12 are brought together and then pressed upon each other by the aforementioned spring clamp means to produce a cavity in mold part 12 according to crown 22.

In a preferred form it is contemplated to insert through bottom openings 16a a tubular member also made of wax or other material (not shown) extending to the face 23 of crown part 22 so that a channel or hollow extension 24 may be provided in said mold part 12 for the reception of excess of formable material, as will be hereinafter explained. After the casting material 20 has hardened in both mold parts the wax die unit 21—22 and the channel forming wax member (not shown) are removed preferably by subjecting the mold parts 11, 12 (still in their joined condition) to a heating or cooking treatment whereby the wax melts and exudes from the opening 16a to the outside of the mold 10.

The mold parts are then separated and the cavities obtained within the casting 20 may then be used for the production of teeth or tooth parts, as will now be further disclosed.

These cavities are formed within casting 20 at a location thereof where wax die parts 21 and 22 were positioned before, whereas the tubular member, when made of wax material leaves a tubular channel 24 in mold part 12.

Previously prepared preferably plasticized resinous material or a composition containing a formable resinous material may then be placed within the cavity produced by die parts 21 and 22 and beside this, further material (resinous or not) may fill at least part of channel or hollow extension 24, before mold parts 11, 12 are pressed upon each other as illustrated in Fig. 4. The resinous material (forming excess material) entering channel 24 may then be compressed by screw member or means 25, which engages threaded bore or opening 16a to project into channel 24 and can be screwed down within mold part 12 toward the mold cavity 22 so as to exert further pressure upon the resinous material placed within the aforesaid cavity of the mold.

Simultaneously heat may be applied to the resinous material by electric heating unit 26 arranged to substantially surround preferably the mold flanges 11b, 12b, through which heat may gradually be transferred to the packing or resinous material. Heating unit 26 may be adjusted in its position by a pin-spring connection 27, 28. Cables 29, 30 connected to plug 31 supply electric current to heating unit 26. One of the cables, say, 30, may contain a thermostat 32 of known construction to regulate and adjust the heat required for hardening the densified resinous material which is placed under outer pressure (by said spring clamp means) and inner pressure (by screw member 25) in mold parts 11, 12. It will be generally sufficient to first heat the packing or resinous material contained in the mold parts, for example, for 10 to 15 minutes up to 175° F., and then to increase the heat up to about 225° F. for half an hour, whereby the said material will be hardened under heat and pressure.

It will be obvious that openings 15a and 16a may be temporarily closed when the mold parts are to be filled with the investment material. The opening 15a or 16a may in some instances be used for completely filling the mold parts with casting or investment material or for adding further formable resinous material through the centrally disposed channel 24.

After termination of the heating process the heating unit 26 may be removed from the mold flanges and the mold parts separated, the casting material easily taken out from the conically shaped mold parts (also by means of a tool (not shown) introduced through bottom opening 15a or 16a) and finally the aforementionel excess material formed within channel 24 may be cut off or otherwise severed from the tooth part or crown at 23.

The heating unit 26 is made to be shifted on or disposed with respect to any desired portion of the mold (in its assembled condition).

From the foregoing description, taken in connection with the accompanying drawing, the advantages of the process and article derived therefrom will be readily understood by those skilled in the art to which the invention pertains; and while there has been described the principles of the process which may be considered to be the best embodiment of the invention, it is to be understood that the process described is merely illustrative and that such changes may be made as are within the scope of the appended claims.

Having thus described the invention, what is claimed as new and desired to secure by Letters Patent, is:

1. In a method for producing dental work, such as jacket crowns, inlays, artificial teeth, tooth parts and the like; the steps consisting in placing into a mold formable material in quantity exceeding that required for forming said dental work, exerting outer pressure on said mold and forcing thereby excess of said formable material into a hollow extension within said mold, and producing further pressure directly against said forced excess of said formable material and substantially centrally of said formable material within said mold, to thereby densify said formable material.

2. In a method for producing dental work, such as jacket crowns, inlays, artificial teeth, tooth parts and the like; the steps consisting in placing into a cavity of a mold corresponding to the tooth part to be formed formable material in excess of the quantity required for forming said tooth part, forcing excess from said material into a channel communicating with said cavity of said mold, and producing further pressure on said forced excess material and against the remaining material within said cavity of said mold whereby said remaining material may be densified.

3. In a method for producing dental work, such as jacket crowns, inlays, artificial teeth, tooth parts and the like; the steps consisting in placing into a cavity of a mold corresponding to the tooth part to be formed in said cavity formable material in excess of the quantity required for forming said tooth part, exerting pressure through said mold on said material thereby forcing excess material into a passage in communication with said mold cavity and extending substantially centrally of the latter, and producing further pressure against said excess material forced into said passage and against the remaining material within said mold cavity from therewithout whereby said remaining material may be densified.

4. In a method according to claim 1, including heating the formable material while it is being densified, and finally severing the excess of said formable material from the remainder of said formable material.

5. A device of the character described comprising a two-part mold, each mold part being provided with a cavity confined by a conical side wall and provided with a central channel passing through one of the end walls of said mold and in communication with said cavity, means to adjust said mold parts with respect to each other and with their conical side walls in opposed relation, said means including yieldable pressure members for engaging said mold parts to clamp the same together, and means adapted to project into said channel toward said mold cavity and adapted to apply pressure directly on formable material when positioned within said mold cavity.

6. In a dental flask, a plurality of engageable mold parts having registering cavities, the walls of which constitute the molding surface, respective means provided on each mold part to arrange said mold parts in engagement with one another, said means including yieldable pressure members adapted to exert outer pressure upon said mold parts to clamp the same together, whereby formable material placed in said cavity is initially compressed against said molding surface, one of said mold parts including a central channel communicating with said cavities, and means intermediate said pressure members and movably arranged in said channel, said intermediate means being adapted to exert centrally directed pressure directly on a portion of the formable material extending into said channel whereby said initially compressed material may be finally densified.

FREDERIC TRYFUS.